(12) United States Patent
Komata et al.

(10) Patent No.: US 8,620,504 B2
(45) Date of Patent: Dec. 31, 2013

(54) DEVICE AND METHOD FOR CONTROLLING VEHICLE

(75) Inventors: Takashi Komata, Toyota (JP); Noritake Mitsutani, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 83 days.

(21) Appl. No.: 13/203,165

(22) PCT Filed: Feb. 25, 2009

(86) PCT No.: PCT/JP2009/053313
§ 371 (c)(1),
(2), (4) Date: Aug. 24, 2011

(87) PCT Pub. No.: WO2010/097897
PCT Pub. Date: Sep. 2, 2010

(65) Prior Publication Data
US 2011/0307136 A1  Dec. 15, 2011

(51) Int. Cl.
*B60L 9/00* (2006.01)
*B60K 1/00* (2006.01)
*H02J 1/00* (2006.01)
*H02P 27/04* (2006.01)

(52) U.S. Cl.
USPC ............ 701/22; 180/65.31; 307/75; 318/801

(58) Field of Classification Search
USPC ............................................. 701/22; 307/9.1
See application file for complete search history.

(56) References Cited

U.S. PATENT DOCUMENTS 5,129,713 A * 7/1992 Matsuda ................. 303/122.05
5,526,263 A * 6/1996 Tanaka et al. ................ 701/70
7,291,934 B2 * 11/2007 Bernardi et al. ............ 290/40 A
7,443,048 B2 * 10/2008 Bernardi et al. ............... 307/9.1
7,576,500 B2 * 8/2009 Patel et al. .................... 318/139
7,609,023 B2 * 10/2009 Egami et al. .................. 318/801

(Continued)

FOREIGN PATENT DOCUMENTS

JP 2004-064803 A 2/2004
JP 2004-336994 A 11/2004

(Continued)

OTHER PUBLICATIONS

International Search Report mailed May 26, 2009 of PCT/JP2009/053313.

*Primary Examiner* — Thomas Black
*Assistant Examiner* — Tyler Paige
(74) *Attorney, Agent, or Firm* — Kenyon & Kenyon LLP

(57) ABSTRACT

An ECU executes a program including the steps of: setting a target boost voltage to a maximum value when a request for changing a sub power supply is made; temporarily increasing discharge electric power of a main power supply and then restricting discharge electric power of the sub power supply before switching; shutting off a gate of a converter on the sub power supply side; performing processing for shutting off an SMR corresponding to the sub power supply before switching; connecting an SMR corresponding to a sub power supply after switching when an absolute value of a current is equal to or lower than a predetermined value; canceling shut-off of the gate of the converter on the sub power supply side; canceling temporary increase in discharge electric power of the main power supply and restriction of discharge electric power of the sub power supply; and canceling the setting of the maximum value as the target boost voltage.

14 Claims, 7 Drawing Sheets

(56) References Cited

U.S. PATENT DOCUMENTS

| | | |
|---|---|---|
| 7,658,249 B2 * | 2/2010 | Buglione et al. ............ 180/65.31 |
| 2004/0189091 A1 * | 9/2004 | Algrain et al. ............... 307/10.1 |
| 2006/0108867 A1 * | 5/2006 | Ralea ........................... 303/152 |
| 2006/0152085 A1 * | 7/2006 | Flett et al. ....................... 307/75 |
| 2009/0032319 A1 * | 2/2009 | Nagashima et al. ......... 180/65.3 |
| 2009/0240415 A1 * | 9/2009 | Sukaria .......................... 701/84 |
| 2009/0250277 A1 * | 10/2009 | Grand et al. ............. 180/65.265 |

FOREIGN PATENT DOCUMENTS

| | | |
|---|---|---|
| JP | 2005-245049 A | 9/2005 |
| JP | 2008-109840 A | 5/2008 |
| JP | 2008-167620 A | 7/2008 |
| JP | 2008-187884 A | 8/2008 |
| JP | 2008-253064 A | 10/2008 |

* cited by examiner

DEVICE AND METHOD FOR CONTROLLING VEHICLE

This is a 371 national phase application of PCT/JP2009/053313 filed 25 Feb. 2009, the contents of which are incorporated herein by reference.

TECHNICAL FIELD

The present invention relates to control for switching between a plurality of sub power supplies in a vehicle incorporating a rotating electric machine and a main power supply and a plurality of sub power supplies for supplying electric power to the rotating electric machine, and particularly to converter control for smoothly switching between sub power supplies.

BACKGROUND ART

A technique for appropriately supplying and receiving electric power between a plurality of power supplies and a load device (for example, a rotating electric machine or the like) has conventionally been known. For example, Japanese Patent Laying-Open No. 2008-109840 (Patent Document 1) discloses a power supply system capable of deriving the system performance to the maximum extent even when a plurality of power storage devices have respective charge/discharge characteristics different from each other. This power supply system is a power supply system capable of supplying and receiving electric power to and from a load device, and includes: a plurality of chargeable power storage devices; an electric power line for supplying and receiving electric power between the power supply system and the load device; a plurality of converters provided in association with the plurality of power storage devices, each of which performs voltage conversion between an associated power storage device and the electric power line; and a control device controlling the plurality of converters. The control device includes a share ratio calculation unit performing at least one of a first calculation to determine a discharge power share ratio between respective electric powers to be discharged from the plurality of power storage devices and a second calculation to determine a charge power share ratio between respective electric powers to be used for charging the plurality of power storage devices, and a converter control unit performing at least one of a first control to control the plurality of converters according to the discharge power share ratio when electric power is supplied from the power supply system to the load device and a second control to control the plurality of converters according to the charge power share ratio when electric power is supplied from the load device to the power supply system. The first calculation is performed to determine, for each of the plurality of power storage devices, a remaining electric power quantity before a state of charge is reached with respect to which allowable discharge electric power is restricted, and determine the discharge power share ratio according to a ratio of the remaining electric power quantity between the plurality of power storage devices. The second calculation is performed to determine, for each of the plurality of power storage devices, a chargeable quantity before a state of charge is reached with respect to which allowable charge electric power is restricted, and determine the charge power share ratio according to a ratio of the chargeable quantity between the plurality of power storage devices.

According to the power supply system disclosed in the publication described above, an opportunity allowing realization of maximal charge and discharge characteristics as the power supply system as a whole is maximized. Consequently, even though the charge and discharge characteristics are different among the plurality of storage devices, maximum performance of the power supply system can be exhibited.

Patent Document 1: Japanese Patent Laying-Open No. 2008-109840

DISCLOSURE OF THE INVENTION

Problems to be Solved by the Invention

Meanwhile, in an example where a plurality of sub power supplies are switched for use in a vehicle incorporating a rotating electric machine representing a load device and a main power supply and the plurality of sub power supplies for supplying electric power to the rotating electric machine, switching between the sub power supplies may be made while the vehicle runs.

Depending on a state of actuation of the load device, however, electric power may be supplied and received between the sub power supply and the main power supply during an operation for switching between the sub power supplies and the switching operation cannot appropriately be performed.

Such a problem is not at all considered in the power supply system disclosed in the publication described above and it cannot be solved.

An object of the present invention is to provide a device and a method for controlling a vehicle, for allowing appropriate switching between sub power supplies.

Means for Solving the Problems

A control device for a vehicle according to one aspect of the present invention is a control device for a vehicle incorporating a main power supply, a first sub power supply, a second sub power supply, a selection portion allowing selection of any one sub power supply of the first and second sub power supplies, a first converter boosting a DC voltage supplied from the main power supply, a second converter boosting a DC voltage supplied from one sub power supply selected by the selection portion, and a rotating electric machine serving as a drive source and receiving electric power supply from the first and second converters. This control device includes a request detection unit for detecting a change request for changing one sub power supply to the other sub power supply, a boost control unit for setting, when the change request is detected and when a target boost voltage of the first and second converters is lower than a predetermined value, the predetermined value as the target boost voltage and controlling the first and second converters such that the set target boost voltage is attained, and a selection control unit for controlling the selection portion so as to satisfy the change request after the predetermined value is set as the target boost voltage.

According to this invention, when a change request is detected and when a target boost voltage of the first and second converters is lower than a predetermined value, the predetermined value is set as the target boost voltage and the first and second converters are controlled. Thus, even though a boosted voltage fluctuates as a result of taking of electric power to the rotating electric machine side in a case where the number of revolutions of the rotating electric machine serving as the drive source increases due to skid or the like of wheels during running of the vehicle, supply and reception of electric power between the main power supply and the sub power supply caused by the boosted voltage becoming lower than a power supply voltage of the main power supply can be suppressed. Therefore, switching from one sub power supply selected by the selection portion to the other sub power supply during supply and reception of electric power is suppressed. Consequently, one sub power supply can be disconnected and the other sub power supply can be selected without causing an arc at a contact of the selection portion (such as a relay). Therefore, a device and a method for controlling a vehicle, for allowing appropriate switching between sub power supplies, can be provided.

Preferably, the second converter includes a switching element. The control device further includes a gate control unit for controlling the second converter so as to shut off a gate of the switching element after the predetermined value is set as the target boost voltage and before control of the selection portion by the selection control unit is started. The selection control unit controls the selection portion so as to satisfy the change request after the gate is shut off.

According to this invention, the gate of the switching element is shut off after the predetermined value is set as the target boost voltage and before control of the selection portion is started, so that supply and reception of electric power between the sub power supply and the main power supply can reliably be suppressed. Therefore, even when the selection portion is controlled to satisfy a request for change, one sub power supply can be disconnected and the other sub power supply can be selected without causing an arc at a contact of the selection portion (such as a relay).

Further preferably, the selection control unit controls the selection portion such that electric power is supplied from the other sub power supply to the second converter after electric power supply from one sub power supply to the second converter is cut off. The control device further includes a current detection portion for detecting a current that flows from one sub power supply to the second converter and a stop unit for stopping control of the selection portion when the current detected by the current detection portion is greater than a predetermined current value after the selection portion is controlled by the selection control unit such that electric power supply from one sub power supply to the second converter is cut off.

According to this invention, when the current in the second converter is greater than the predetermined current value after the selection portion is controlled such that electric power supply from one sub power supply to the second converter is cut off, it is likely that the selection portion has not appropriately cut off electric power supply from one sub power supply to the second converter. By stopping control of the selection portion in such a case, switching from one sub power supply to the other sub power supply during supply and reception of electric power between the main power supply and the sub power supply is suppressed.

Further preferably, the second converter includes a capacitor used for an operation for boosting the DC voltage supplied from one sub power supply. The control device includes a discharge control unit for carrying out discharge control of the second converter such that electric power in the capacitor is consumed after the selection portion is controlled such that supply of the DC voltage from one sub power supply to the second converter is cut off and before the selection portion is controlled such that supply of the DC voltage from the other sub power supply to the second converter is started, and a determination unit for determining that the selection portion is abnormal when a voltage of the capacitor is higher than a predetermined voltage after discharge control and determining that the selection portion is normal when the voltage of the capacitor is equal to or lower than the predetermined voltage. The selection control unit controls the selection portion so as to satisfy the change request when the selection portion has been determined as normal.

According to this invention, by carrying out discharge control such that electric power in the capacitor is consumed after the selection portion is controlled such that supply of the DC voltage from one sub power supply to the second converter is cut off and before the selection portion is controlled such that supply of the DC voltage from the other sub power supply to the second converter is started and determining whether the selection portion is normal or not based on a result of carrying out discharge control, switching of the selection portion can appropriately be made.

Further preferably, the control device further includes a canceling unit for canceling control carried out along with detection of the change request after the selection portion has been controlled to satisfy the change request.

According to this invention, by canceling control carried out along with detection of the change request, a behavior of the vehicle can appropriately be controlled in accordance with a request based on a state of the vehicle or a driver's request.

Further preferably, the first and second sub power supplies are chargeable. The control device further includes a charge amount detection portion for detecting an amount of charge of the first and second sub power supplies. The request detection unit detects the change request when the amount of charge of one sub power supply is lower than a predetermined amount of charge.

According to this invention, by requesting change to the other sub power supply when the amount of charge of one sub power supply is lower than the predetermined amount of charge, electric power in accordance with drive force requested by a driver or drive force requested based on a state of the vehicle can be supplied to the rotating electric machine.

Further preferably, the vehicle is a hybrid vehicle incorporating as a drive source, an internal combustion engine in addition to the rotating electric machine.

According to this invention, as a result of application to a hybrid vehicle, switching between sub power supplies provided in a hybrid vehicle can appropriately be made.

Effects of the Invention

When a change request is detected and when a target boost voltage of the first and second converters is lower than a predetermined value, the predetermined value is set as the target boost voltage and the first and second converters are controlled. Thus, even though a boosted voltage fluctuates as a result of taking of electric power to the rotating electric machine side in a case where the number of revolutions of the rotating electric machine serving as the drive source increases due to skid or the like of wheels during running of the vehicle, supply and reception of electric power between the main power supply and the sub power supply caused by the boosted voltage becoming lower than a power supply voltage of the main power supply can be suppressed. Therefore, switching from one sub power supply selected by the selection portion to the other sub power supply during supply and reception of electric power is suppressed. Consequently, one sub power supply can be disconnected and the other sub power supply can be selected without causing an arc at a contact of the selection portion (such as a relay).

Figure 1:
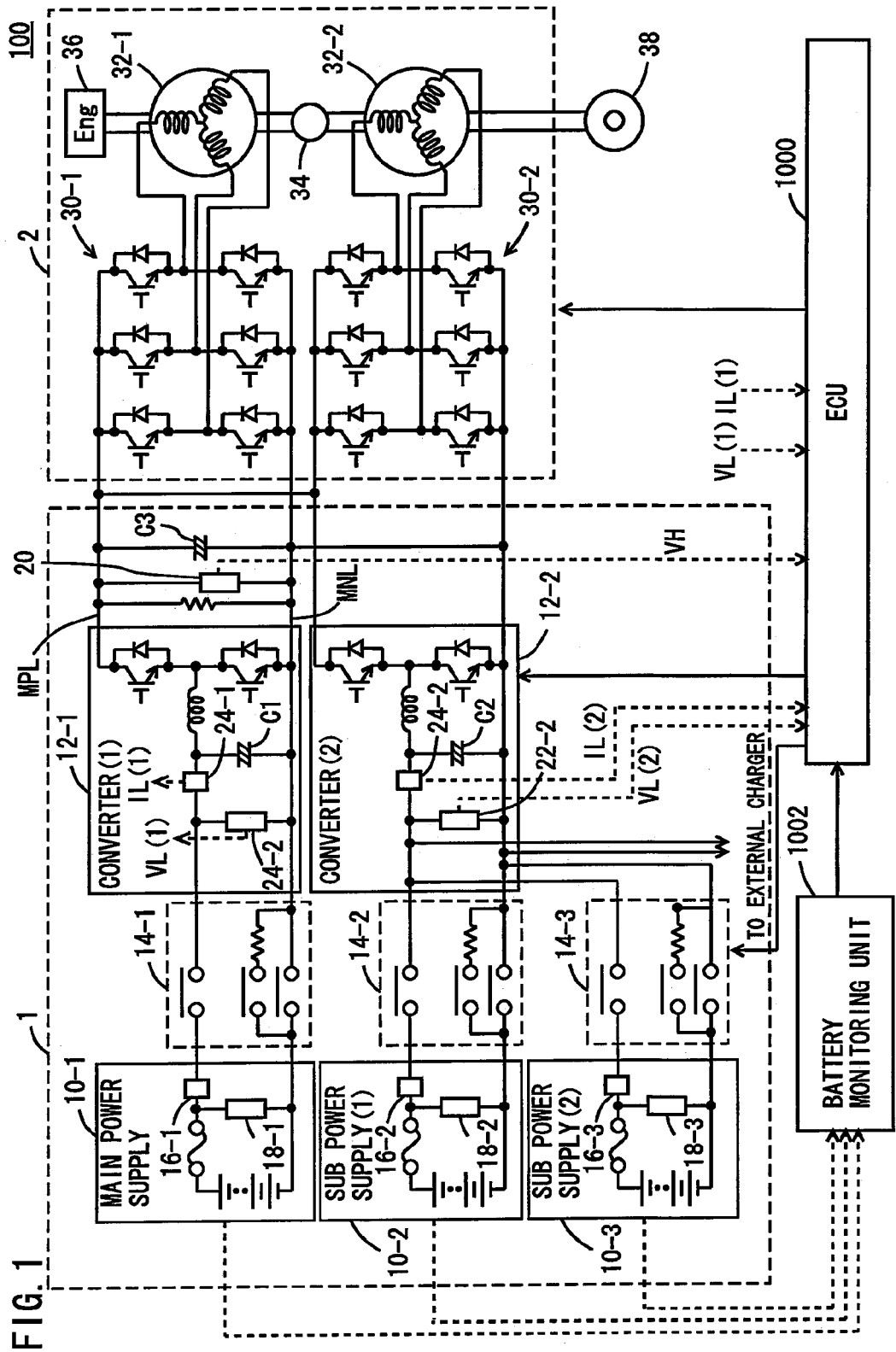
FIG. 1 is an overall block diagram of a hybrid vehicle incorporating a control device for a vehicle according to the present embodiment.

DESCRIPTION OF THE REFERENCE SIGNS 1 power supply system; 2 drive force generation portion; 10-1 main power supply; 10-2, 10-3 sub power supply; 12-1, 12-2 converter; 14-1, 14-2, 14-3 SMR; 18-1, 18-2, 18-3, 20, 22-1, 22-2 voltage sensor; 16-1, 16-2, 16-3, 24 current sensor; 30-1, 30-2 inverter; 32-1, 32-2 MG; 34 power split device; 36 engine; 38 drive wheel; 42 chopper circuit; 100 vehicle; 1000 ECU; 1002 battery monitoring unit; 1010 request detection unit; 1020 boost control unit; 1030, 1110 discharge electric power control unit; 1040 gate shut-off unit; 1050 SMR shut-off processing unit; 1060 discharge control unit; 1070 voltage determination unit; 1080 current determination unit; 1090 SMR connection processing unit; 1100 gate shut-off canceling unit; 1120 boost canceling unit; 1130 stop processing unit; C1, C2, C3 capacitor; D1A, D1B diode; L1 inductor; and Q1A, Q1B switching element.

BEST MODES FOR CARRYING OUT THE INVENTION

An embodiment of the present invention will be described hereinafter with reference to the drawings. In the description below, the same elements have the same reference characters allotted. Their label and function are also identical. Therefore, detailed description thereof will not be repeated.

As shown in FIG. 1, a vehicle 100 includes a power supply system 1, a drive force generation portion 2, an ECU (Electronic Control Unit) 1000, and a battery monitoring unit 1002. Drive force generation portion 2 includes an inverter (1) 30-1, an inverter (2) 30-2, an MG (Motor Generator) (1) 32-1, an MG (2) 32-2, a power split device 34, an engine 36, and a drive wheel 38.

Though vehicle 100 is described as a hybrid vehicle in the present embodiment, it is not particularly limited to a hybrid vehicle and it may be any vehicle including at least a rotating electric machine as a drive source. Therefore, vehicle 100 may be an electric car.

MG (1) 32-1, MG (2) 32-2 and engine 36 are coupled to power split device 34. This vehicle 100 runs with drive force from at least one drive source of engine 36 and MG (2) 32-2. Motive power generated by engine 36 is split into two paths by power split device 34. One is a path for transmission to drive wheel 38 and the other is a path for transmission to MG (1) 32-1.

Each of MG (1) 32-1 and MG (2) 32-2 is an AC rotating electric machine, and it is implemented, for example, by a three-phase AC rotating electric machine including a rotor having a permanent magnet embedded. MG (1) 32-1 generates electric power by using motive power from engine 36 split by power split device 34. For example, when SOC (State of Charge) of a main power supply 10-1 included in power supply system 1 is lower than a predetermined value, engine 36 starts and MG (1) 32-1 generates electric power and generated electric power is supplied to power supply system 1.

MG (2) 32-2 generates drive force by using at least one of electric power supplied from power supply system 1 and electric power generated by MG (1) 32-1. Drive force from MG (2) 32-2 is transmitted to drive wheel 38. It is noted that, during braking or the like of the vehicle, MG (2) 32-2 is driven by drive wheel 38 and MG (2) 32-2 is actuated as a generator. Thus, MG (2) 32-2 is actuated as a regenerative brake converting braking energy to electric power. Electric power generated by MG (2) 32-2 is supplied to power supply system 1.

Power split device 34 is implemented by a planetary gear including a sun gear, a pinion gear, a carrier, and a ring gear. The pinion gear is engaged with the sun gear and the ring gear. The carrier rotatably supports the pinion gear and it is coupled to a crankshaft of engine 36. The sun gear is coupled to a rotation shaft of MG (1) 32-1. The ring gear is coupled to a rotation shaft of MG (2) 32-2.

Inverter (1) 30-1 and inverter (2) 30-2 are each connected to a main positive bus MPL and a main negative bus MNL. Inverter (1) 30-1 and inverter (2) 30-2 convert drive electric power (DC power) supplied from power supply system 1 to AC power and output AC power to MG (1) 32-1 and MG (2) 32-2, respectively. Inverter (1) 30-1 and inverter (2) 30-2 convert AC power generated by MG (1) 32-1 and MG (2) 32-2 to DC power and output DC power as regenerative electric power to power supply system 1.

It is noted that each of inverter (1) 30-1 and inverter (2) 30-2 is implemented, for example, by a bridge circuit including switching elements of three phases. Inverter (1) 30-1 drives MG (1) 32-1 by performing a switching operation in response to a drive signal from ECU 1000. Inverter (2) 30-2 drives MG (2) 32-2 by performing a switching operation in response to a drive signal from ECU 1000.

ECU 1000 calculates requested vehicle power Ps based on a detection signal from each not-shown sensor, a running status, an accelerator position, or the like, and calculates a torque target value and a target value of the number of revolutions of MG (1) 32-1 and MG (2) 32-2 based on calculated requested vehicle power Ps. ECU 1000 controls inverter (1) 30-1 and inverter (2) 30-2 such that generated torque and the number of revolutions of MG (1) 32-1 and MG (2) 32-2 attain to the respective target values.

Power supply system 1 includes main power supply 10-1, a sub power supply (1) 10-2, a sub power supply (2) 10-3, a converter (1) 12-1, a converter (2) 12-2, an SMR (System Main Relay) (1) 14-1, an SMR (2) 14-2, an SMR (3) 14-3, main positive bus MPL, main negative bus MNL, a smoothing capacitor C3, and a voltage sensor 20. It is noted that the number of sub power supplies is not limited to two and three or more sub power supplies may be provided.

Each of main power supply 10-1, sub power supply (1) 10-2 and sub power supply (2) 10-3 is a rechargeable DC power supply, and it is implemented, for example, by a secondary battery such as a nickel metal hydride battery or a lithium ion battery, a capacitor of a large capacity, or the like.

Main power supply 10-1 is connected to converter (1) 12-1 with SMR (1) 14-1 being interposed. Sub power supply (1) 10-2 is connected to converter (2) 12-2 with SMR (2) 14-2 being interposed. In addition, sub power supply (2) 10-3 is connected to converter (2) 12-2 with SMR (3) 14-3 being interposed.

One of SMR (2) 14-2 and SMR (3) 14-3 is rendered conductive and the other of them is disconnected, in response to a switching signal from ECU 1000.

For example, when SMR (2) 14-2 is rendered conductive and SMR (3) 14-3 is disconnected, sub power supply (1) 10-2 is electrically connected to converter (2) 12-2. Therefore, electric power in sub power supply (1) 10-2 is supplied to converter (2) 12-2.

Alternatively, when SMR (3) 14-3 is rendered conductive and SMR (2) 14-2 is disconnected, sub power supply (2) 10-3 is electrically connected to converter (2) 12-2. Therefore, electric power in sub power supply (2) 10-3 is supplied to converter (2) 12-2.

As SMR (2) 14-2 and SMR (3) 14-3 are thus controlled, a sub power supply to supply electric power to converter (2) 12-2 is selected.

Converter (1) 12-1 and converter (2) 12-2 are connected in parallel to main positive bus MPL and main negative bus MNL. Converter (1) 12-1 converts a voltage between main power supply 10-1 and main positive bus MPL, main negative bus MNL, based on a control signal from ECU 1000. Converter (2) 12-2 converts a voltage between any of sub power supply (1) 10-2 and sub power supply (2) 10-3 and main positive bus MPL, main negative bus MNL, based on a control signal from ECU 1000.

Smoothing capacitor C3 is connected between main positive bus MPL and main negative bus MNL and it reduces an electric power fluctuation component included in main positive bus MPL and main negative bus MNL.

Voltage sensor 20 detects a voltage VH across main positive bus MPL and main negative bus MNL and transmits a detection value to ECU 1000.

A voltage sensor 22-1 detects an input voltage VL(1) of converter (1) 12-1 and transmits a detection value to ECU 1000. A current sensor 24-1 detects a current IL(1) in converter (1) 12-1 and transmits a detection value to ECU 1000.

A voltage sensor 22-2 detects an input voltage VL(2) of converter (2) 12-2 and transmits a detection value to ECU 1000. A current sensor 24-2 detects a current IL(2) in converter (2) 12-2 and transmits a detection value to ECU 1000.

It is noted that current sensor 24-1 (or current sensor 24-2) detects a current output from the main power supply (or the sub power supply) side to converter (1) 12-1 (or converter (2) 12-2) side (discharge current) as a positive value, while it detects a current input from converter (1) 12-1 (or converter (2) 12-2) side to the main power supply (or the sub power supply) side (charge current) as a negative value. Though FIG. 1 shows a case where current sensor 24-1, 24-2 detects a current through a positive electrode line, current sensor 24-1, 24-2 may detect a current through a negative electrode line.

ECU 1000 generates a control signal for successively switching between sub power supply (1) 10-2 and sub power supply (2) 10-3 for use and transmits the control signal to SMR (2) 14-2 and SMR (3) 14-3. For example, ECU 1000 detects a request for changing a sub power supply when SOC of sub power supply (1) 10-2 is lower than a predetermined amount of charge while sub power supply (1) 10-2 is electrically connected to converter (2) 12-2 by SMR (2) 14-2 rendered conductive and disconnected SMR (3) 14-3, and generates a control signal such that SMR (2) 14-2 rendered conductive is now disconnected and disconnected SMR (3) 14-3 is in turn rendered conductive.

In addition, ECU 1000 receives each detection value from a current sensor 16-1 and a voltage sensor 18-1 provided in main power supply 10-1 through battery monitoring unit 1002. Moreover, ECU 1000 receives each detection value from a current sensor 16-2 and a voltage sensor 18-2 provided in sub power supply (1) 10-2 through battery monitoring unit 1002. Further, ECU 1000 receives each detection value from a current sensor 16-3 and a voltage sensor 18-3 provided in sub power supply (2) 10-3 through battery monitoring unit 1002.

ECU 1000 generates a control signal for controlling converter (1) 12-1 and converter (2) 12-2 based on each detection value from current sensor 16-1 and voltage sensor 18-1 and requested vehicle power Ps. ECU 1000 transmits the generated control signal to each of converter (1) 12-1 and converter (2) 12-2 and controls converter (1) 12-1 and converter (2) 12-2.

Here, in a discharge mode in which electric power is supplied from power supply system 1 to drive force generation portion 2 (that is, requested vehicle power Ps>0), ECU 1000 controls converter (1) 12-1 and converter (2) 12-2 in accordance with a predetermined discharge allocation ratio. The discharge allocation ratio refers to allocation of electric power to be discharged from main power supply 10-1 and any one of sub power supply (1) 10-2 and sub power supply (2) 10-3.

It is noted that ECU 1000 may calculate the discharge allocation ratio in accordance with a ratio with respect to the total of a dischargeable electric power amount of main power supply 10-1 and a dischargeable electric power amount of any one sub power supply selected from sub power supply (1) 10-2 and sub power supply (2) 10-3 and control converter (1) 12-1 and converter (2) 12-2 in accordance with the calculated discharge allocation ratio.

In addition, in a charge mode in which electric power is supplied from drive force generation portion 2 to power supply system 1 (that is, requested vehicle power Ps<0), ECU 1000 controls converter (1) 12-1 and converter (2) 12-2 in accordance with a predetermined charge allocation ratio. The charge allocation ratio refers to allocation of electric power for charging main power supply 10-1 and any one of sub power supply (1) 10-2 and sub power supply (2) 10-3.

It is noted that ECU 1000 may calculate the charge allocation ratio in accordance with a ratio with respect to the total of a chargeable electric power amount of main power supply 10-1 and a chargeable electric power amount of any one sub power supply selected from sub power supply (1) 10-2 and sub power supply (2) 10-3 and control converter (1) 12-1 and converter (2) 12-2 in accordance with the calculated charge allocation ratio.

In addition, ECU 1000 controls converter (1) 12-1 so as to adjust voltage VH to a prescribed target boost voltage, and controls converter (2) 12-2 so as to adjust charge and discharge of any one of sub power supply (1) 10-2 and sub power supply (2) 10-3 electrically connected to converter (2) 12-2 through SMR (2) 14-2 or SMR (3) 14-3 to a prescribed target amount.

Figure 2:
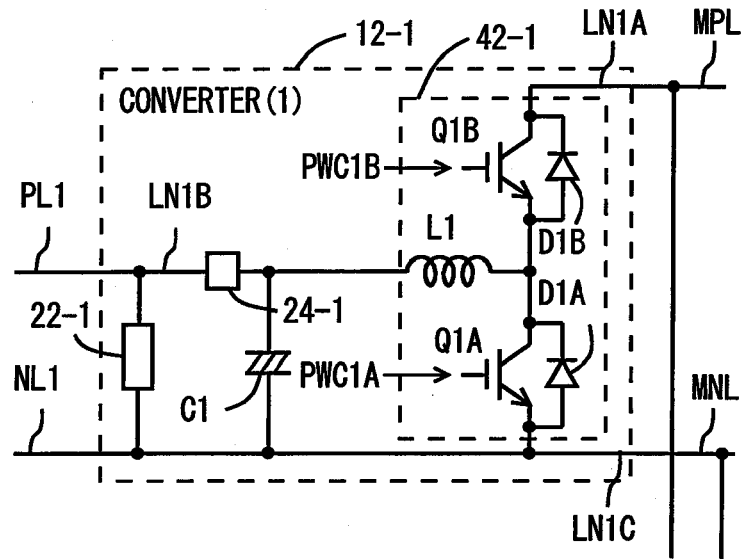
FIG. 2 is a diagram showing an overall configuration of a converter.

FIG. 2 shows an overall configuration of converter (1) 12-1. A configuration and an operation of converter (1) 12-1 will be described below in detail, and detailed description of a configuration and an operation of converter (2) 12-2 will not be repeated, because they are the same as those of converter (1) 12-1.

Converter (1) 12-1 includes a chopper circuit 42-1, a positive bus LN1A, a negative bus LN1C, a line LN1B, and a smoothing capacitor C1. Chopper circuit 42-1 includes switching elements Q1A, Q1B, diodes D1A, D1B, and an inductor L1.

Positive bus LN1A has one end connected to a collector of switching element Q1B and the other end connected to main positive bus MPL. Negative bus LN1C has one end connected to a negative line NL1 and the other end connected to main negative bus MNL.

Switching elements Q1A, Q1B are connected in series between negative bus LN1C and positive bus LN1A. Specifically, an emitter of switching element Q1A is connected to negative bus LN1C and the collector of switching element Q1B is connected to positive bus LN1A. Diodes D1A, D1B are connected in anti-parallel to switching elements Q1A, Q1B, respectively. Inductor L1 is connected between a connection node of switching elements Q1A, Q1B and line LN1B. Switching element Q1A, Q1B is implemented, for example, by an IGBT (Insulated Gate Bipolar Transistor) element.

Line LN1B has one end connected to a positive electrode line PL1 and the other end connected to inductor L1. Smoothing capacitor C1 is connected between line LN1B and negative bus LN1C and reduces an AC component included in a DC voltage across line LN1B and negative bus LN1C.

Chopper circuit 42-1 performs bidirectional DC voltage conversion between main power supply 10-1 and main positive bus MPL, main negative bus MNL, in response to a control signal from ECU 1000. The control signal includes a drive signal PWC1A for controlling ON/OFF of switching element Q1A constituting a lower arm element and a drive signal PWC1B for controlling ON/OFF of switching element Q1B constituting an upper arm element. Then, ECU 1000 controls a duty ratio (a ratio between ON/OFF periods) of switching element Q1A, Q1B within a certain duty cycle (the sum of an ON period and an OFF period).

When switching elements Q1A, Q1B are controlled to increase ON duty of switching element Q1A (since ON/OFF of switching elements Q1A, Q1B is complementarily controlled except for a dead time period, ON duty of switching element Q1B decreases), an amount of a pump current that flows from main power supply 10-1 to inductor L1 increases and electromagnetic energy stored in inductor L1 increases. Consequently, an amount of a current released from inductor L1 through diode D1B to main positive bus MPL at the timing of transition of switching element Q1A from the ON state to the OFF state increases and hence a voltage on main positive bus MPL is raised.

On the other hand, when switching elements Q1A, Q1B are controlled to increase ON duty of switching element Q1B (ON duty of switching element Q1A decreases), an amount of a current that flows from main positive bus MPL through switching element Q1B and inductor L1 to main power supply 10-1 increases and hence a voltage on main positive bus MPL lowers.

By thus controlling the duty ratio of switching elements Q1A, Q1B, a voltage on main positive bus MPL can be controlled and a direction of a current (electric power) that flows between main power supply 10-1 and main positive bus MPL and an amount of the current (an amount of electric power) can be controlled.

In a vehicle having a configuration as described above, an operation for switching between the sub power supplies may be performed while the vehicle is running. Therefore, during an operation for switching between the sub power supplies, it is necessary to avoid supply and reception of electric power between a sub power supply and the main power supply that is caused by change in a drive state of wheels.

Figure 3:
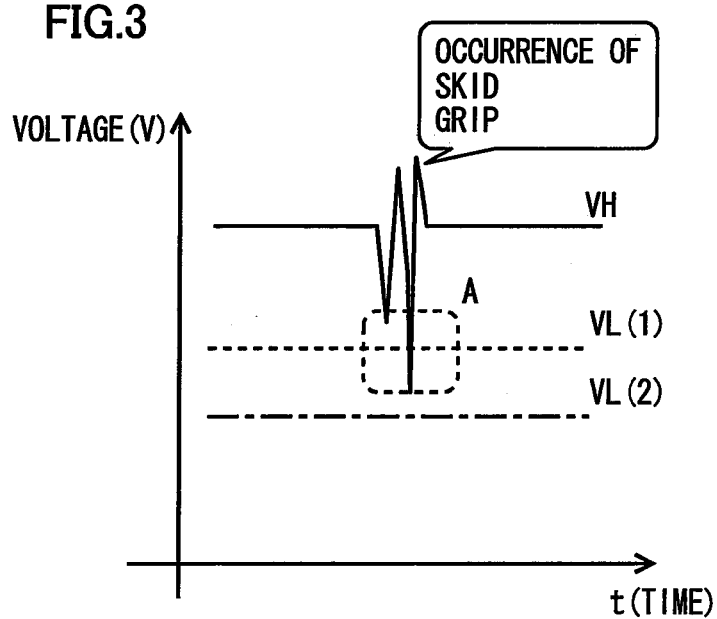
FIG. 3 is a timing chart (No. 1) showing change in an output voltage of a converter and respective power supply voltages of a main power supply and a sub power supply.

For example, as shown in FIG. 3, a case where a vehicle runs in a steady state is assumed. In a case where wheels skid on a road surface due to change in a state of the road surface (for example, a coefficient of friction or the like) and then grip, the number of revolutions of wheels abruptly increases due to skid of the wheels. Here, electric power is taken to the MG (2) 32-2 side due to increase in the number of revolutions of MG (2) 32-2. Therefore, as shown in a frame A shown with a dashed line in FIG. 3, voltage VH across main positive bus MPL and main negative bus MNL may become lower than a voltage VL(1) supplied from main power supply 10-1 to converter (1) 12-1. Therefore, electric power supplied from main power supply 10-1 may be supplied through converter (1) 12-1 and converter (2) 12-2 to sub power supply (1) 10-2 or sub power supply (2) 10-3 electrically connected by SMR (2) 14-2 and SMR (3) 14-3.

If such supply and reception of electric power between main power supply 10-1 and sub power supply (1) 10-2 or sub power supply (2) 10-3 occurs during the operation for switching between the sub power supplies, an arc is produced at a contact of SMR (2) 14-2 or SMR (3) 14-3, which causes partial high temperature and resultant failure in appropriately performing a switching operation.

The feature of the present embodiment resides in that, when a request for change from any one of sub power supply (1) 10-2 and sub power supply (2) 10-3 to the other of them is detected and when a target boost voltage of converter (1) 12-1 and converter (2) 12-2 is lower than a predetermined value, ECU 1000 sets the predetermined value as the target boost voltage and controls converter (1) 12-1 and converter (2) 12-2 so as to attain the set target boost voltage and controls SMR (2) 14-2 and SMR (3) 14-3 such that the detected request for change is satisfied after the predetermined value is set as the target boost voltage.

In addition, in the present embodiment, ECU 1000 controls converter (2) 12-2 so as to shut off the gate of switching element Q1A, Q1B after the predetermined value is set as the target boost voltage and before control of SMR (2) 14-2 and SMR (3) 14-3 is started so as to satisfy the request for change. ECU 1000 controls SMR (2) 14-2 and SMR (3) 14-3 such that the detected request for change is satisfied after the gates of respective switching elements Q1A, Q1B of converter (2) 12-2 are shut off.

Moreover, ECU 1000 stops control of SMR (3) 14-3, that is, switching between the sub power supplies, when the detection value detected by current sensor 24 is greater than a predetermined current value after SMR (2) 14-2 or SMR (3) 14-3 is controlled to cut off supply of a DC voltage from a sub power supply selected from sub power supply (1) 10-2 and sub power supply (2) 10-3 to converter (2) 12-2.

Further, ECU 1000 carries out discharge control of converter (2) 12-2 such that electric power in capacitor C1 is consumed after SMR (2) 14-2 or SMR (3) 14-3 is controlled such that supply of a DC voltage from any one sub power supply selected from sub power supply (1) 10-2 and sub power supply (2) 10-3 to converter (2) 12-2 is cut off and before SMR (2) 14-2 or SMR (3) 14-3 is controlled such that supply of a DC voltage from the other sub power supply to converter (2) 12-2 is started. ECU 1000 determines that SMR (2) 14-2 or SMR (3) 14-3 is abnormal when a state that a voltage of capacitor C2 is higher than a predetermined voltage continues until a predetermined time period elapses after discharge control, and ECU 1000 determines that SMR (2) 14-2 and SMR (3) 14-3 are normal when a voltage of capacitor C2 is equal to or lower than the predetermined voltage by the time when the predetermined time period elapses. When SMR (2) 14-2 and SMR (3) 14-3 are determined as normal, ECU 1000 controls SMR (2) 14-2 or SMR (3) 14-3 so as to satisfy the request for change.

Figure 4:
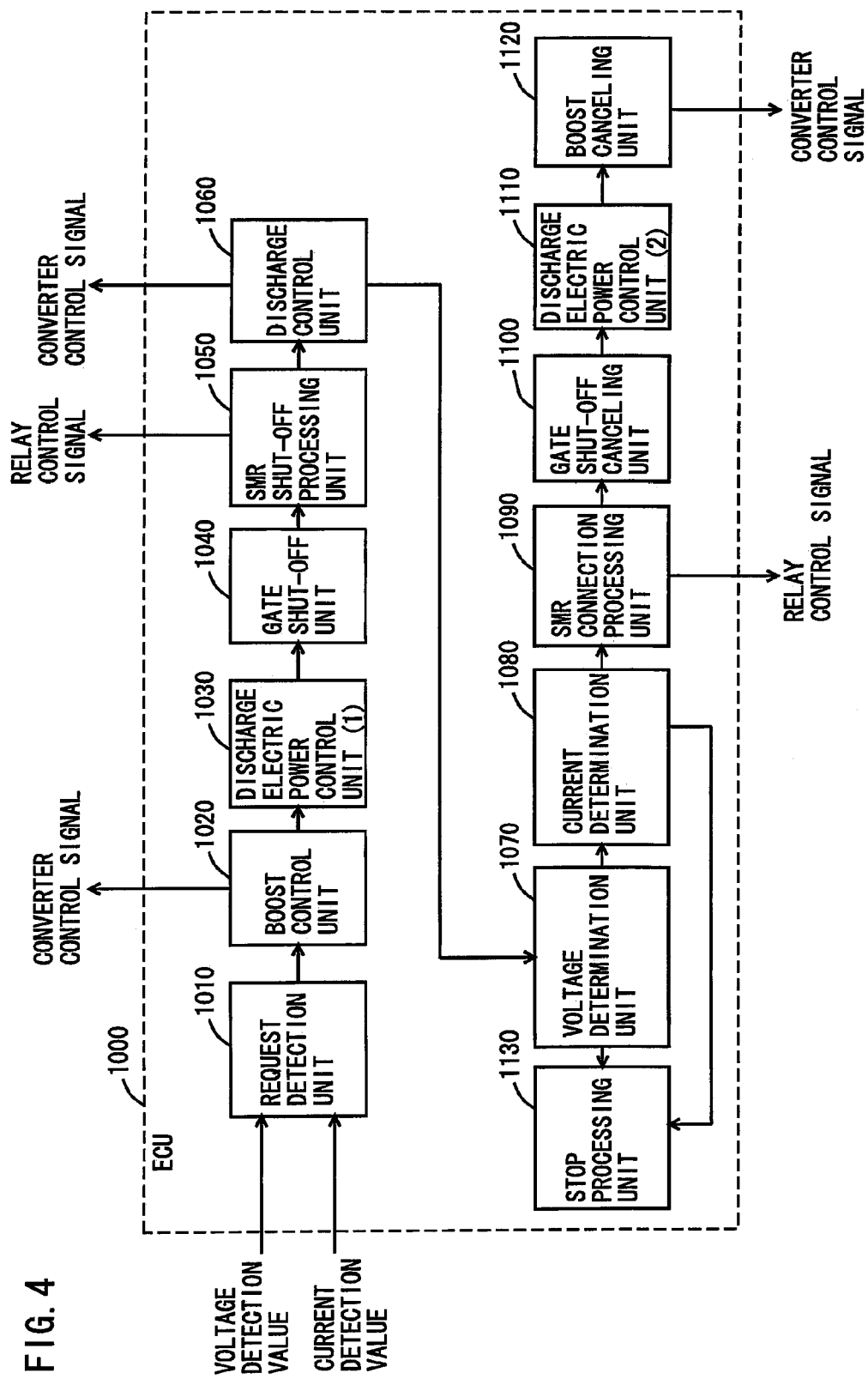
FIG. 4 is a functional block diagram of an ECU serving as the control device for a vehicle according to the present embodiment.

FIG. 4 shows a functional block diagram of ECU 1000 representing the control device for a vehicle according to the present embodiment. ECU 1000 includes a request detection unit 1010, a boost control unit 1020, a discharge electric power control unit (1) 1030, a gate shut-off unit 1040, an SMR shut-off processing unit 1050, a discharge control unit 1060, a voltage determination unit 1070, a current determination unit 1080, an SMR connection processing unit 1090, a gate shut-off canceling unit 1100, a discharge electric power control unit (2) 1110, a boost canceling unit 1120, and a stop processing unit 1130.

Request detection unit 1010 detects a request for changing a sub power supply. For example, when SOC of any one sub power supply selected from sub power supply (1) 10-2 and sub power supply (2) 10-3 is equal to or lower than a predetermined amount of charge, request detection unit 1010 detects a request for changing a sub power supply. Request detection unit 1010 calculates SOC, for example, based on a voltage and a current of sub power supply (1) 10-2 and sub power supply (2) 10-3. It is noted that various known techniques can be used as a method of calculating SOC. It is noted that request detection unit 1010 may turn on a request detection flag when it detects a request for changing a sub power supply.

When a request for changing a sub power supply is made (that is, when SOC of a sub power supply selected from sub power supply (1) 10-2 and sub power supply (2) 10-3 is equal to or lower than a predetermined amount of charge), boost control unit 1020 sets a target boost voltage of voltage VH across main positive bus MPL and main negative bus MNL to a maximum value VHmax and controls converter (2) 12-2 to raise a voltage to the set target boost voltage. Maximum value VHmax representing the target boost voltage indicates a maximum voltage value to which a voltage can be boosted in converter (2) 12-2. It is noted that, when a request for changing a sub power supply is made and when maximum value VHmax has already been set as the target boost voltage, boost control unit 1020 does not change the target boost voltage but maintains the setting.

Though description is given in the present embodiment assuming that the predetermined value set as the target boost voltage is maximum value VHmax when a request for changing a sub power supply is made, the predetermined value is not particularly limited to maximum value VHmax and any voltage capable of maintaining such a state that voltage VH is higher than main power supply 10-1 VL(1) least when skid or the like of wheels occurs should only be employed. In addition, for example, when the request detection flag is set from OFF to ON, boost control unit 1020 may start boost control described above.

Discharge electric power control unit (1) 1030 temporarily raises discharge electric power Wout(1) of main power supply 10-1 after the target boost voltage is set to maximum value VHmax. It is noted that magnitude of increase may be set to a predetermined value or a value set in accordance with a state of the vehicle. In addition, discharge electric power control unit (1) 1030 restricts discharge electric power Wout(2) of a selected sub power supply to zero with temporary increase in discharge electric power Wout(1) of main power supply 10-1.

After the target boost voltage is set to maximum value VHmax, gate shut-off unit 1040 shuts off the gates of switching elements Q1A, Q1B of converter (2) 12-2 and stops drive of switching elements Q1A, Q1B.

SMR shut-off processing unit 1050 controls any one corresponding to a sub power supply before switching, of SMR (2) 14-2 and SMR (3) 14-3, such that connection between the sub power supply before switching and converter (2) 12-2 is electrically cut off.

For example, when a sub power supply before switching is sub power supply (1) 10-2, SMR shut-off processing unit 1050 controls SMR (2) 14-2 such that connection between sub power supply (1) 10-2 and converter (2) 12-2 is electrically cut off.

For example, when a sub power supply before switching is sub power supply (2) 10-3, SMR shut-off processing unit 1050 controls SMR (3) 14-3 such that connection between sub power supply (2) 10-3 and converter (2) 12-2 is electrically cut off.

Discharge control unit 1060 carries out discharge control such that electric power in capacitor C2 is consumed after processing for shutting off the SMR corresponding to the sub power supply before switching is completed. It is noted that discharge control unit 1060 should only carry out discharge control at least before voltage determination which will be described later or after current determination which will be described later. Discharge control is carried out, for example, by driving switching element Q1B corresponding to the upper arm element of converter (2) 12-2 so as to perform a boost operation. As switching element Q1B is driven, electric power in capacitor C2 is consumed.

Voltage determination unit 1070 determines whether electric power in capacitor C2 has been discharged or not, based on a voltage VL(2). Specifically, voltage determination unit 1070 determines whether voltage VL(2) is equal to or lower than a predetermined value Va or not by the time when a predetermined time period elapses after discharge control is started. The predetermined time period is not particularly limited, so long as it is a time period allowing determination that discharge from capacitor C2 has not been carried out. It is noted that voltage determination unit 1070 may turn on a voltage determination flag when voltage VL(2) is equal to or lower than a predetermined value V.

Current determination unit 1080 determines whether an absolute value of a current IL(2) is equal to or lower than a predetermined value Ia or not. Predetermined value Ia is not particularly limited, so long as it is a value, for example, allowing determination that a current flows between sub power supply (1) 10-2 or sub power supply (2) 10-3 and converter (2) 12-2. It is noted that current determination unit 1080 may turn on a current determination flag, for example, when an absolute value of current IL(2) is equal to or lower than predetermined value Ia.

When the absolute value of current IL(2) is equal to or lower than predetermined value Ia, SMR connection processing unit 1090 controls any one corresponding to a sub power supply after switching, of SMR (2) 14-2 and SMR (3) 14-3, such that the sub power supply after switching and converter (2) 12-2 are rendered electrically conductive.

For example, when the sub power supply after switching is sub power supply (1) 10-2, SMR connection processing unit 1090 controls SMR (2) 14-2 such that sub power supply (1) 10-2 and converter (2) 12-2 are rendered electrically conductive.

For example, when the sub power supply after switching is sub power supply (2) 10-3, SMR connection processing unit 1090 controls SMR (3) 14-3 such that sub power supply (2) 10-3 and converter (2) 12-2 are rendered electrically conductive.

Gate shut-off canceling unit 1100 controls SMR (2) 14-2 or SMR (3) 14-3 such that the sub power supply after switching and converter (2) 12-2 are rendered electrically conductive and thereafter cancels shut-off of the gates of switching elements Q1A, Q1B of converter (2) 12-2.

After shut-off of the gates of switching elements Q1A, Q1B of converter (2) 12-2 is canceled, discharge electric power control unit (2) 1110 cancels temporary increase in discharge electric power Wout(1) of main power supply 10-1. In addition, discharge electric power control unit (2) 1110 cancels restriction to set discharge electric power Wout(2) of the selected sub power supply, along with canceling of temporary increase in discharge electric power Wout(1) of main power supply 10-1.

Boost canceling unit 1120 cancels boost control for setting the target boost voltage to maximum value VHmax. Namely, boost canceling unit 1120 sets the target boost voltage back to the target boost voltage in accordance with a state of the vehicle.

Stop processing unit 1130 performs stop processing when voltage determination unit 1070 determines that voltage VL(2) is not equal to or lower than predetermined value Va by the time when the predetermined time period elapses after discharge control is started or when the absolute value of current IL(2) is higher than predetermined value Ia in current determination unit 1080. Stop processing unit 1130 stops control of SMR (2) 14-2 and SMR (3) 14-3. In addition, stop processing unit 1130 may control SMR (1) 14-1 so as to cut off electrical connection between the main power supply and converter (1) 12-1, for example, after a predetermined condition such as stop of the vehicle is satisfied, or it may notify a driver or a passenger of the vehicle that switching between the sub power supplies has not appropriately been made, by means of a notification apparatus (such as an information display apparatus or an audio output apparatus).

In the present embodiment, request detection unit 1010, boost control unit 1020, discharge electric power control unit (1) 1030, gate shut-off unit 1040, SMR shut-off processing unit 1050, discharge control unit 1060, voltage determination unit 1070, current determination unit 1080, SMR connection processing unit 1090, gate shut-off canceling unit 1100, discharge electric power control unit (2) 1110, boost canceling unit 1120, and stop processing unit 1130 are all described as functioning as software implemented by a CPU of ECU 1000 executing a program stored in a memory, however, they may be implemented by hardware. It is noted that such a program is recorded on a storage medium and mounted on a vehicle.

Figure 5:
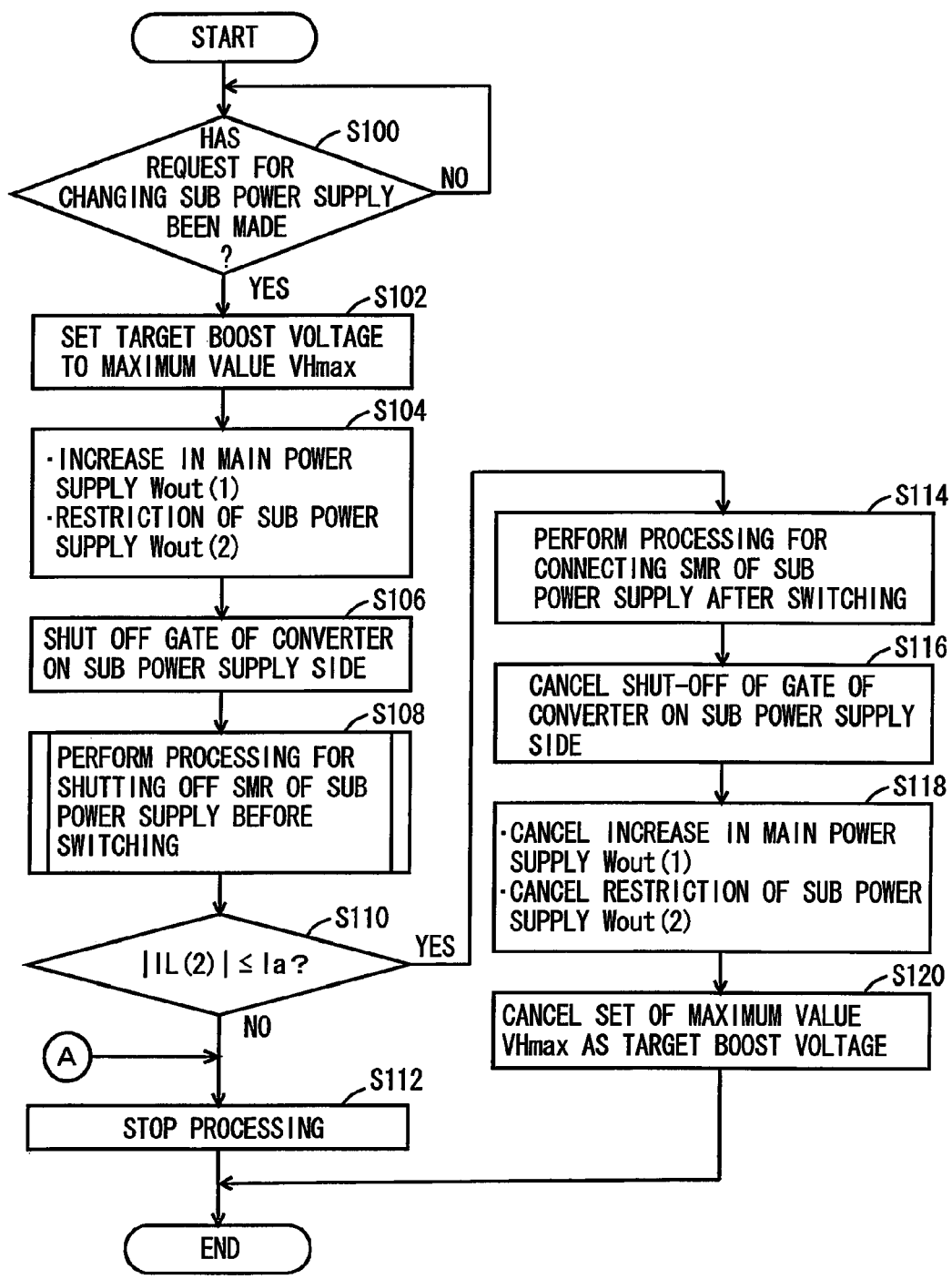
FIG. 5 is a flowchart showing a control structure of a program executed by the ECU serving as the control device for a vehicle according to the present embodiment.

A control structure of a program executed in ECU 1000 representing the control device for a vehicle according to the present embodiment will be described with reference to FIG. 5.

In step (hereinafter step will be denoted as S) 100, ECU 1000 determines whether a request for changing a sub power supply has been made or not. When a request for changing a sub power supply has been made (YES in S100), the process proceeds to S102. Otherwise (NO in S100), the process returns to S100.

In S102, ECU 1000 sets the target boost voltage to maximum value VHmax. In S104, ECU 1000 temporarily increases discharge electric power Wout(1) in main power supply 10-1 and restricts discharge electric power Wout(2) of the sub power supply before switching to zero. In S106, ECU 1000 controls converter (2) 12-2 such that the gate of converter (2) 12-2 is shut off.

In S108, ECU 1000 performs the processing for shutting off an SMR of the sub power supply before switching. It is noted that the processing for shutting off an SMR of the sub power supply before switching will be described later. In S110, ECU 1000 determines whether the absolute value of current IL(2) is equal to or lower than predetermined value Ia or not. When the absolute value of current IL(2) is equal to or lower than predetermined value Ia (YES in S110), the process proceeds to S114. Otherwise (NO in S110), the process proceeds to S112.

In S112, ECU 1000 performs stop processing. In S114, ECU 1000 controls any one of SMR (2) 14-2 and SMR (3) 14-3 corresponding to the sub power supply after switching such that the sub power supply after switching and converter (2) 12-2 are electrically connected to each other.

In S116, ECU 1000 cancels shut-off of the gate of converter (2) 12-2. In S118, ECU 1000 cancels temporary increase in discharge electric power Wout(1) in main power supply 10-1 and cancels restriction to set discharge electric power Wout (2) of the selected sub power supply to zero. In S120, ECU 1000 cancels the setting of the maximum value VHmax as the target boost voltage.

Figure 6:
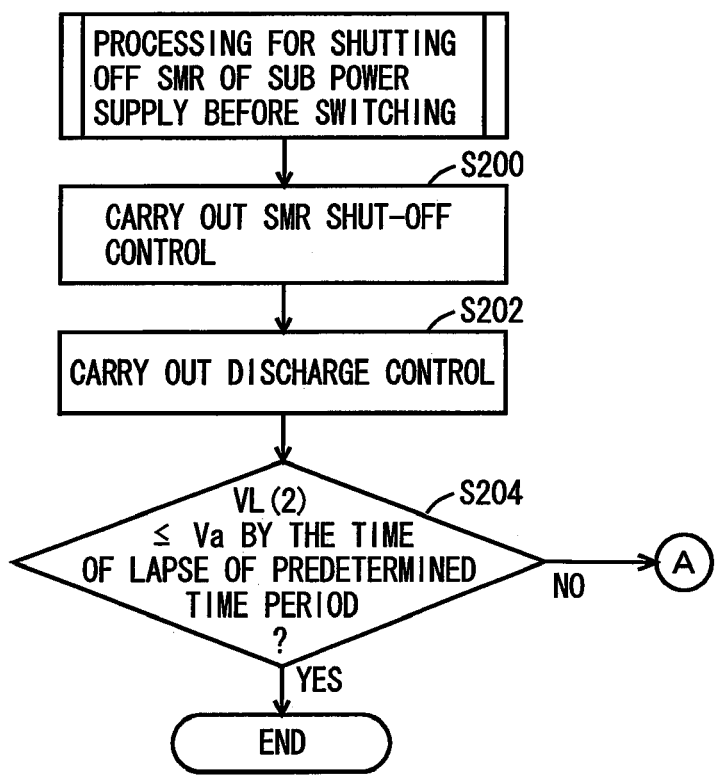
FIG. 6 is a flowchart showing a control structure of a program for processing for shutting off an SMR of a sub power supply before switching, executed by the ECU serving as the control device for a vehicle according to the present embodiment.

A control structure of a program for the processing for shutting off an SMR of the sub power supply before switching, executed by ECU 1000 representing the control device for a vehicle according to the present embodiment, will now be described with reference to FIG. 6.

In S200, ECU 1000 controls any one corresponding to the sub power supply before switching, of SMR (2) 14-2 and SMR (3) 14-3, such that the sub power supply before switching and converter (2) 12-2 are electrically disconnected from each other.

In S202, ECU 1000 carries out discharge control. In S204, ECU 1000 determines whether voltage VL(2) of capacitor C2 is equal to or lower than predetermined value Va or not, by the time when the predetermined time period elapses after discharge control is carried out. When voltage VL(2) is equal to or lower than predetermined value Va by the time when the predetermined time period elapses (YES in S204), this process ends. Otherwise (NO in S204), the process proceeds to S112.

An operation of ECU 1000 representing the control device for a vehicle according to the present embodiment based on the structure and the flowchart as above will be described with reference to FIGS. 7, 8 and 9. In the description below, a case where sub power supply (1) 10-2 corresponds to the sub power supply before switching and sub power supply (2) 10-3 corresponds to the sub power supply after switching will be described by way of example.

For example, when SOC of sub power supply (1) 10-2 is equal to or lower than a predetermined amount of charge while the vehicle is running, a request for changing the sub power supply is detected (YES in S100). Therefore, the target boost voltage is set to maximum value VHmax (S102).

Figure 7:
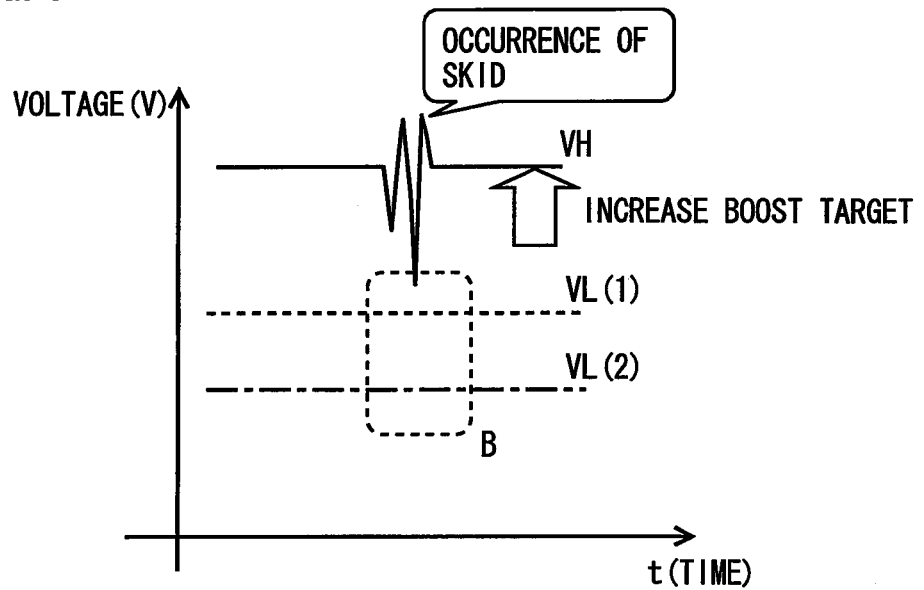
FIG. 7 is a timing chart (No. 2) showing change in an output voltage of a converter and respective power supply voltages of a main power supply and a sub power supply.

As the target boost voltage is set to maximum value VHmax, output voltage VH of converter (1) 12-1 and converter (2) 12-2 increases as shown in FIG. 7. Therefore, even though the number of revolutions of MG (2) 32-2 increases and electric power is taken due to occurrence of skid of wheels, as shown in a frame B shown with a dashed line in FIG. 7, appearance of a period during which voltage VH is lower than VL(1) is suppressed. Therefore, supply and reception of electric power between the main power supply and sub power supply (1) 10-2 is suppressed. Namely, by setting the target boost voltage to maximum value VHmax at the time when the request for change is detected, supply and reception of electric power between the main power supply and sub power supply (1) 10-2 during the operation for switching between the sub power supplies is suppressed.

After maximum value VHmax is set, discharge electric power Wout(1) of main power supply 10-1 is temporarily increased and discharge electric power Wout(2) of sub power supply (1) 10-2 is restricted to zero (S104). After control of discharge electric power Wout(1) of main power supply 10-1 and discharge electric power Wout(2) of sub power supply (1) 10-2, the gate of converter (2) 12-2 is shut off (S106).

Figure 8:
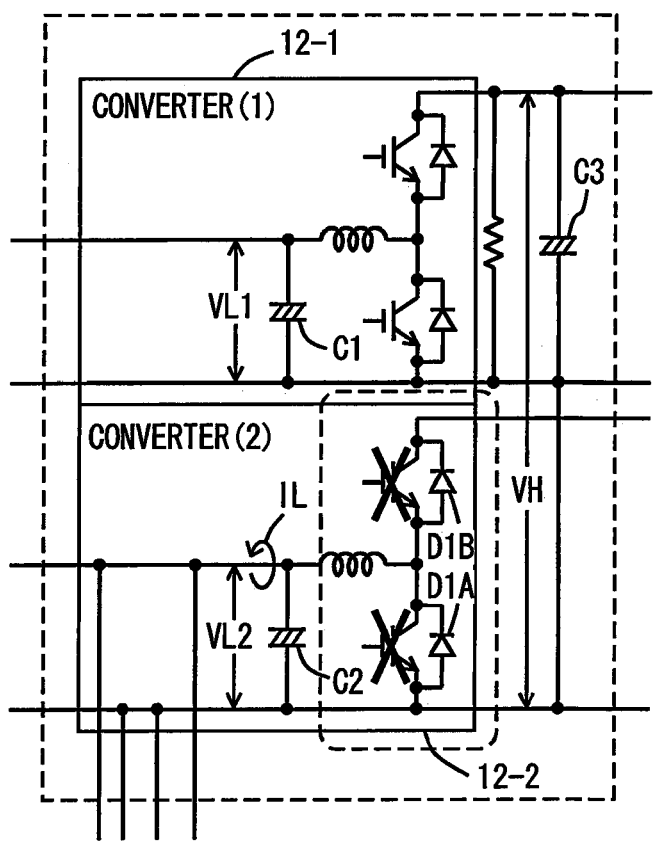
FIG. 8 is a diagram for illustrating an operation for shutting off a gate of the converter.

Therefore, when the gates of switching elements Q1A, Q1B are shut off as shown in FIG. 8, supply and reception of electric power from converter (1) 12-1 to converter (2) 12-2 is suppressed by diodes D1A, D1B.

After the gate of converter (2) 12-2 is shut off, the processing for shutting off an SMR of the sub power supply before switching is performed (S108). Namely, SMR (2) 14-2 is controlled such that sub power supply (1) 10-2 and converter (2) 12-2 are electrically disconnected from each other (S200) and discharge control is carried out (S202).

Figure 9:
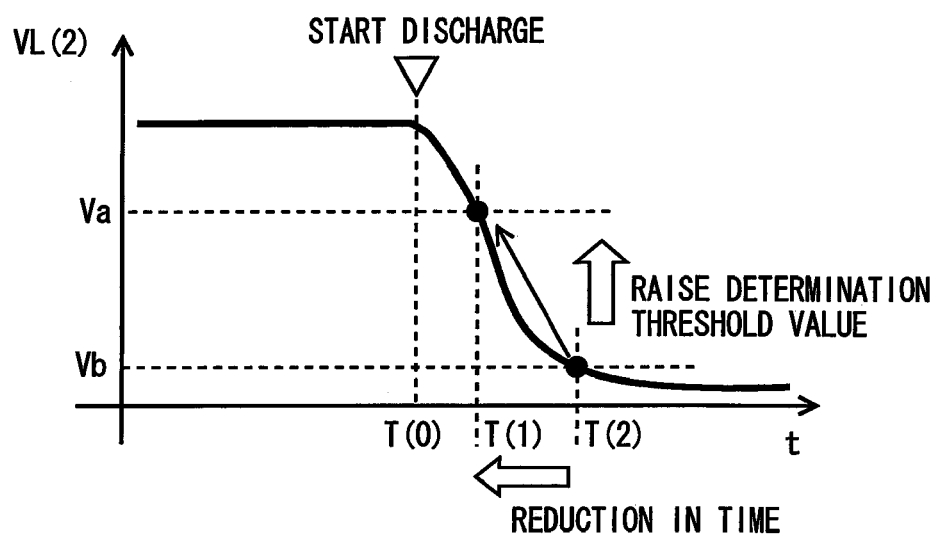
FIG. 9 is a timing chart showing change in a capacitor voltage during discharge control.

For example, FIG. 9 shows variation in voltage VL(2) when discharge control is carried out. The abscissa in FIG. 9 indicates time and the ordinate in FIG. 9 indicates voltage VL(2).

As shown in FIG. 9, discharge control is started at time T(0) (S202). When voltage VL(2) is equal to or lower than predetermined value Va (YES in S204) at time T(1) before the predetermined time period elapses, it is determined that SMR (2) 14-2 is appropriately actuated and converter (2) 12-2 and sub power supply (1) 10-2 are normally disconnected from each other.

It is noted that predetermined value Va should only be a value at least allowing determination that voltage VL(2) has lowered, and a value greater than a value Vb indicating that electric power charged to capacitor C2 has sufficiently been discharged can be set. Predetermined value Vb indicating that electric power charged to capacitor C2 has sufficiently been discharged is a value suitable, for example, for a case where discharge control is carried out in order to ensure safety when a vehicle collides or the like.

Therefore, the time point of determination (time T(1)) when whether electric power in capacitor C2 is consumed or not is determined based on predetermined value Va is earlier than the time point of determination (time T(2)) when whether electric power in capacitor C2 is consumed or not is determined based on predetermined value Vb, and thus the time required for voltage determination after discharge control can be reduced.

When the absolute value of current IL(2) is equal to or lower than predetermined value Ia (YES in S110), SMR (3) 14-3 is controlled such that sub power supply (2) 10-3 and converter (2) 12-2 are electrically connected to each other (S114).

Then, after shut-off of the gate of converter (2) 12-2 is canceled (S116), temporary increase in discharge electric power Wout(1) of main power supply 10-1 and restriction to set discharge electric power Wout(2) of sub power supply (2) 10-3 to zero are canceled (S118). Thereafter, the setting of maximum value VHmax as the target boost voltage is canceled (S120).

When voltage VL(2) is not equal to or lower than predetermined value Va by the time when the predetermined time period elapses after discharge control (NO in S204) or when the absolute value of current IL(2) is not equal to or lower than predetermined value Ia (NO in S110), the stop processing is performed (S112).

As described above, according to the control device for a vehicle in the present embodiment, when the request for change is detected, converters (1) and (2) are controlled with maximum value Vhmax being set as the target boost voltage. Thus, even though a boosted voltage fluctuates as a result of taking of electric power to the MG (2) side in a case where the number of revolutions of MG (2) serving as the drive source increases due to skid or the like of wheels during running of the vehicle, supply and reception of electric power between the main power supply and the sub power supply caused by boosted voltage VH becoming lower than power supply voltage VL(1) of the main power supply can be suppressed. Therefore, switching from one selected sub power supply to the other sub power supply during supply and reception of electric power is suppressed. Consequently, one sub power supply can be disconnected and the other sub power supply can be selected without causing an arc at a contact of the relay. Therefore, a device and a method for controlling a vehicle, for allowing appropriate switching between sub power supplies, can be provided.

In addition, by shutting off the gate of the switching element of converter (2) after the target boost voltage is set to maximum value VHmax and before control for shutting off an SMR corresponding to the sub power supply before switching is started, supply and reception of electric power between the sub power supply and the main power supply can reliably be suppressed.

Further, when the absolute value of current IL(2) in converter (2) is higher than the predetermined value after the SMR is controlled to cut off electrical connection between the sub power supply before switching and converter (2), cut-off of electrical connection between the sub power supply before switching and converter (2) may not have been successful. By performing stop processing in such a case, switching from the sub power supply before switching to the sub power supply after switching during supply and reception of electric power is suppressed.

Then, by carrying out discharge control so as to consume electric power in capacitor C2 before the SMR is controlled to electrically connect the sub power supply after switching and converter (2) to each other, switching between the sub power supplies can appropriately be made.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A control device for a vehicle incorporating a main power supply, a first sub power supply, a second sub power supply, a selection portion allowing selection of any one sub power supply of said first and second sub power supplies, a first converter boosting a DC voltage supplied from said main power supply, a second converter boosting a DC voltage supplied from one sub power supply selected by said selection portion, and a rotating electric machine serving as a drive source and receiving electric power supply from said first and second converters, comprising:
an electronic control unit, the electronic control unit further comprising:
a request detection unit;
a boost control unit; and
a selection control unit,
the electronic control unit programmed to detect a change request for changing said one sub power supply to the other sub power supply with the request detection unit;
the electronic control unit programmed to set, when said change request is detected and when a target boost voltage of said first and second converters is lower than a predetermined value, said predetermined value as the target boost voltage and to control said first and second converters such that set said target boost voltage is attained, with the boost control unit; and the electronic control unit programmed to control said selection portion so as to satisfy said change request after said predetermined value is set as the target boost voltage with the selection control unit, wherein said predetermined value being a value for maintaining such a state that a voltage of said first converter on a side of the rotating electric machine is higher than at least a voltage of said main power supply when skid of wheels of said vehicle occurs.

2. The control device for a vehicle according to claim 1, wherein said second converter includes a switching element, said electronic control unit further comprises a gate control unit for controlling said second converter so as to shut off a gate of said switching element after said predetermined value is set as the target boost voltage and before control of said selection portion by said selection control unit is started, and said selection control unit controls said selection portion so as to satisfy said change request after said gate is shut off.

3. The control device for a vehicle according to claim 1, wherein said selection control unit controls said selection portion such that electric power is supplied from said other sub power supply to said second converter after electric power supply from said one sub power supply to said second converter is cut off, and said electronic control unit further comprises a current detection portion for detecting a current that flows from said one sub power supply to the second converter; and a stop unit for stopping control of said selection portion when said current detected by said current detection portion is greater than a predetermined current value after said selection portion is controlled by said selection control unit such that electric power supply from said one sub power supply to said second converter is cut off.

4. The control device for a vehicle according to claim 1, wherein said second converter includes a capacitor used for an operation for boosting the DC voltage supplied from said one sub power supply, said electronic control unit further comprises a discharge control unit for carrying out discharge control of said second converter such that electric power in said capacitor is consumed after said selection portion is controlled such that supply of the DC voltage from said one sub power supply to said second converter is cut off and before said selection portion is controlled such that supply of the DC voltage from said other sub power supply to said second converter is started; and a determination unit for determining that said selection portion is abnormal when a voltage of said capacitor is higher than a predetermined voltage after said discharge control and determining that said selection portion is normal when the voltage of said capacitor is equal to or lower than said predetermined voltage, and said selection control unit controls said selection portion so as to satisfy said change request when said selection portion has been determined as normal.

5. The control device for a vehicle according to claim 1, the electronic control unit further comprising a canceling unit for canceling control carried out along with detection of said change request after said selection portion has been controlled to satisfy said change request.

6. The control device for a vehicle according to claim 1, wherein said first and second sub power supplies are chargeable, said electronic control unit further comprises a charge amount detection portion for detecting an amount of charge of said first and second sub power supplies, and said request detection unit detects said change request when the amount of charge of said one sub power supply is lower than a predetermined amount of charge.

7. The control device for a vehicle according to claim 1, wherein said vehicle is a hybrid vehicle incorporating as a drive source, an internal combustion engine in addition to said rotating electric machine.

8. A method of controlling a vehicle including a main power supply, a first sub power supply, a second sub power supply, a selection portion, a first converter, a second converter, a rotating electric machine serving as a drive source and receiving electric power supply from said first and second converters, and an electronic control unit including a request detection unit, a boost control unit; and a selection control unit, comprising the steps of:

selecting any one sub power supply of said first and second sub power supplies with the selection portion, boosting a DC voltage supplied from said main power supply with the first converter, boosting a DC voltage supplied from one sub power supply selected by said selection portion with said second converter, detecting a change request for changing said one sub power supply to the other sub power supply with the request detection unit;

setting, said predetermined value as the target boost voltage and controlling said first and second converters such that said target boost voltage is attained with the boost control unit; and controlling said selection portion so as to satisfy said change request after said predetermined value is set as the target boost voltage with the selection control unit, wherein said predetermined value being a value for maintaining such a state that a voltage of said first converter on a side of the rotating electric machine is higher than at least a voltage of said main power supply when skid of wheels of said vehicle occurs, and wherein said change request is detected when a target boost voltage of said first and second converters is lower than a predetermined value.

9. The method of controlling a vehicle according to claim 8, wherein said second converter includes a switching element, said method of controlling a vehicle further comprises the step of controlling said second converter so as to shut off a gate of said switching element after said predetermined value is set as the target boost voltage and before control of said selection portion is started in said step of controlling said selection portion with a gate control unit of the electronic control unit, and in said step of controlling said selection portion, said selection portion is controlled so as to satisfy said change request after said gate is shut off.

10. The method of controlling a vehicle according to claim 8, wherein in said step of controlling said selection portion, said selection portion is controlled such that electric power is supplied from said other sub power supply to said second converter after electric power supply from said one sub power supply to said second converter is cut off, and said method of controlling a vehicle further comprises the steps of:

detecting a current that flows from said one sub power supply to the second converter with a current detection portion of the electronic control unit; and stopping control of said selection portion when detected said current is greater than a predetermined current value after said selection portion is controlled in said step of controlling said selection portion such that electric power supply from said one sub power supply to said second converter is cut off with a stop unit of the electronic control unit.

11. The method of controlling a vehicle according to claim 8, wherein said second converter includes a capacitor used for an operation for boosting the DC voltage supplied from said one sub power supply, said method of controlling a vehicle comprises the steps of:

carrying out discharge control of said second converter such that electric power in said capacitor is consumed after said selection portion is controlled such that supply of the DC voltage from said one sub power supply to said second converter is cut off and before said selection portion is controlled such that supply of the DC voltage from said other sub power supply to said second converter is started with a discharge control unit of the electronic control unit; and determining that said selection portion is abnormal when a voltage of said capacitor is higher than a predetermined voltage after said discharge control and determining that said selection portion is normal when the voltage of said capacitor is equal to or lower than said predetermined voltage with a determination unit of the electronic control unit, and in said step of controlling said selection portion, said selection portion is controlled so as to satisfy said change request when said selection portion has been determined as normal.

12. The method of controlling a vehicle according to claim 8, further comprising the step of canceling control carried out along with detection of said change request after said selection portion has been controlled to satisfy said request for change with a canceling unit of the electronic control unit.

13. The method of controlling a vehicle according to claim 8, wherein said first and second sub power supplies are chargeable, said method of controlling a vehicle further comprises the step of detecting an amount of charge of said first and second sub power supplies with a charge amount detection portion of the electronic control unit, and in said step of detecting a change request, said change request is detected when the amount of charge of said one sub power supply is lower than a predetermined amount of charge.

14. The method of controlling a vehicle according to claim 8, wherein said vehicle is a hybrid vehicle incorporating as a drive source, an internal combustion engine in addition to said rotating electric machine.

* * * * *